US006190563B1

(12) United States Patent
Bambic

(10) Patent No.: US 6,190,563 B1
(45) Date of Patent: Feb. 20, 2001

(54) MAGNETIC APPARATUS AND METHOD FOR MULTI-PARTICLE FILTRATION AND SEPARATION

(76) Inventor: Petar Bambic, 646 Shappel, Calumet City, IL (US) 60409

( * ) Notice: Under 35 U.S.C. 154(b), the term of this patent shall be extended for 0 days.

(21) Appl. No.: 09/306,255

(22) Filed: May 6, 1999

Related U.S. Application Data

(63) Continuation-in-part of application No. 08/925,693, filed on Sep. 9, 1997, now abandoned.

(51) Int. Cl.[7] .................................................. B01D 38/06

(52) U.S. Cl. .......................... 210/695; 210/222; 209/228; 209/232

(58) Field of Search .................................... 210/138, 143, 210/222, 223, 695; 209/228, 232

(56) References Cited

U.S. PATENT DOCUMENTS

| | | |
|---|---|---|
| 3,143,496 | 8/1964 | Maretzo . |
| 3,608,718 | 9/1971 | Aubrey, Sr. . |
| 3,979,288 | 9/1976 | Heitmann et al. . |
| 4,087,358 | 5/1978 | Oder . |
| 4,306,970 | 12/1981 | Tanaka et al. . |
| 4,317,719 | 3/1982 | Tokuno . |
| 4,366,065 | 12/1982 | Leslie et al. . |
| 4,444,659 | 4/1984 | Beelitz et al. . |
| 4,529,516 | 7/1985 | Nolan . |
| 4,557,828 | 12/1985 | Dittrich . |
| 4,784,758 | 11/1988 | Willis . |
| 5,006,240 | 4/1991 | Steffero, Sr. . |
| 5,137,629 | 8/1992 | Dauchez . |
| 5,340,472 | 8/1994 | Heck . |
| 5,470,466 | 11/1995 | Schaff . |

*Primary Examiner*—David A. Reifsnyder
(74) *Attorney, Agent, or Firm*—Trexler, Bushnell, Giangiorgi, Blackstone & Marr, Ltd.

(57) ABSTRACT

A novel method and apparatus for removing multi-particulate matter from a medium is disclosed. The device includes a containment vessel for accumulating particles, and the containment vessel includes an increased diameter, generally spherical portion for accumulating the particles therein. The containment vessel may also include an electromagnetic matrix which is capable of being energized and de-energized. A blow valve is located at a lower portion of the containment vessel, and the blow valve is capable of being opened and closed, and can preferably be operated simultaneously with the energizing and de-energizing of the electromagnetic matrix. Opening of the blow valve preferably provides that the particles can evacuate from the containment vessel, and specifically from the increased diameter, generally spherical portion thereof, through the blow valve.

13 Claims, 8 Drawing Sheets

MAGNETIC APPARATUS AND METHOD FOR MULTI-PARTICLE FILTRATION AND SEPARATION

RELATED APPLICATION

This application is a continuation-in-part of U.S. patent application Ser. No. 08/925,693 filed Sep. 9, 1997 now abandoned.

BACKGROUND

This invention is generally directed to a method and apparatus for multi-particle filtration and separation. More particularly, the invention contemplates an apparatus and method which can effectively both filter and separate multi-particles suspended in a medium, wherein the multi-particles may comprise magnetic and/or non-magnetic particles.

In the art of treating mediums which have been contaminated with particulate matter, such as magnetic and non-magnetic particles, various types of individual filtration and separation devices have been developed. Such devices have become necessary in order to remove particles from a medium, where a cleaner medium is required in order to provide that the medium can perform a certain function, such as where the medium is to be used as a coolant or as a lubricant.

Present particle removal systems typically utilize a first device to filter the larger particles from the medium. Then, a second device is used to separate the magnetic particles from the medium. Finally, a third device is used to settle out the smaller particles from the medium. As a result, the typical particle removal system is complex and consists of various individual particle removal units, along with associated conduits and flow valves. Consequently, the typical particle removal system has a high initial cost of purchase.

Moreover, the typical particle removal system uses a magnetic filtration device to separate the magnetic particles from the medium. The typical magnetic filtration device consists of a electromagnetic matrix which attracts the magnetic particles from the medium as the medium flows thereby. Unfortunately, the matrix, in addition to attracting the magnetic particles thereto, typically accumulates non-magnetic material thereon. This accumulation on the magnet requires that the magnet be cleaned periodically because the accumulation can reduce the effectiveness of the filtration device as less and less magnetic particles are attracted to the magnet and the flow rate through the filtration device becomes hindered. To remedy this accumulation problem, a cleaning process is typically utilized, such as a manual cleaning in order to remove the accumulation of particles within the filtration device. Alternatively, the filtration device may be cleaned by conducting a series of flushes therethrough. Regardless, the cleaning process usually translates into maintenance and cleaning costs, as well as system down time.

In contrast to conventional filtration/separation devices, the present invention both filters and separates particles from a medium utilizing, essentially, a single device. The present invention allows for the removal of magnetic and/or non-magnetic particles (multi-particles) contained in a medium, without the need to use several complex individual filtration and settling devices, and without the need for the associated conduits and flow valves which would normally be required to inter-connect the individual devices. This results in a lower initial cost of purchase, along with a reduction in the amount of maintenance and upkeep required.

Further, the present invention provides that magnetic particles can be removed from a medium without having to employ an electromagnetic matrix. However, if an electromagnetic matrix is employed with the present invention, the present invention provides that non-magnetic particles which begin to build up on the electromagnetic matrix are easily removed during operation, thereby alleviating the accumulation problem associated with conventional magnetic filtration devices, and avoiding the disadvantages normally associated therewith.

OBJECTS AND SUMMARY

A general object of the present invention is to provide an apparatus and method for the removal of particles from a medium.

An object of the present invention is to provide an apparatus and method for the removal of magnetic and/or non-magnetic particles from a medium, without necessarily having to employ an electromagnetic matrix.

Another object of the present invention is to provide a simple and highly efficient apparatus and method for the continuous removal of magnetic and/or nonmagnetic particles from a medium, without the continuous need to manually shutdown, clean, and service the apparatus.

Briefly, and in accordance with the foregoing, the present invention envisions a filtration and separation device and method for removing particles from a medium. The device includes a containment vessel for accumulating particles, and the containment vessel includes an increased diameter, generally spherical portion for accumulating the particles therein. The containment vessel may also include an electromagnetic matrix which is capable of being energized and de-energized. A blow valve is located at a lower portion of the containment vessel, and the blow valve is capable of being opened and closed, and can preferably be operated simultaneously with the energizing and de-energizing of the electromagnetic matrix. Opening of the blow valve preferably provides that the particles can evacuate from the containment vessel, and specifically from the increased diameter, generally spherical portion thereof, through the blow valve.

The method for removing particles from a medium in accordance with the present invention envisions introducing a flow of the medium to a containment vessel having an increased diameter, generally spherical portion while simultaneously maintaining a valve on the containment vessel in a closed position. The increased diameter, generally spherical portion generally retains the particles as purified medium leaves the containment vessel. After a period of time, the blow valve is opened, resulting in the particles being evacuated from the containment vessel. The steps of the method can be repeated at periodic time intervals.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF EMBODIMENTS

Figure 1:
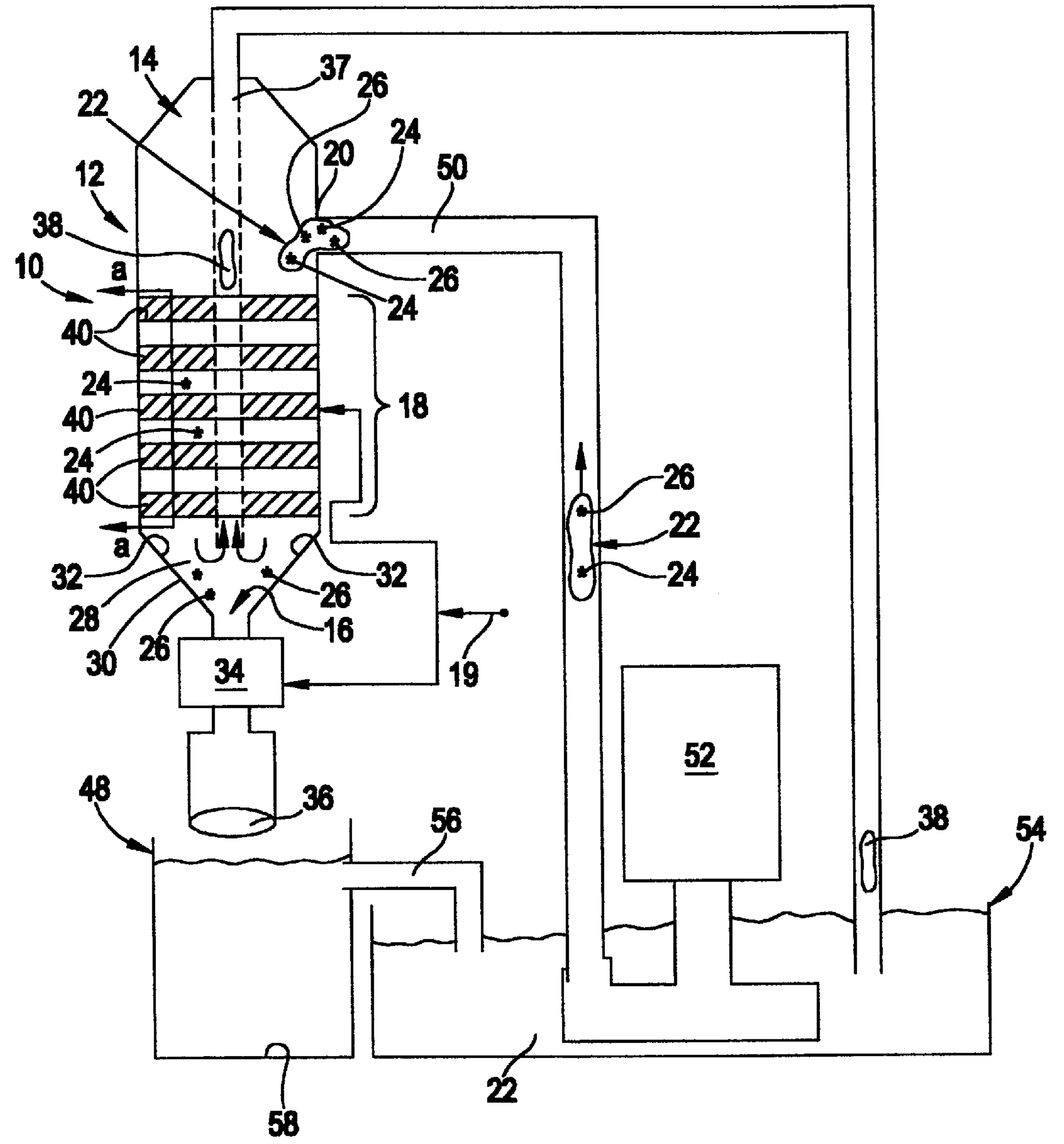
FIG. 1 is a schematic view of a novel filtration/separation device in accordance with the present invention showing operation when an electromagnetic matrix is energized and a valve is closed.

While the invention may be susceptible to embodiment in different forms, there are shown in the drawings, and herein will be described in detail, specific embodiments with the understanding that the present disclosure is to be considered an exemplification of the principles of the invention, and is not intended to limit the invention to that as illustrated and described herein.

The present invention is directed to a novel filtration/separation device and method. Shown in FIG. 1 is a novel filtration/separation device 10 in accordance a first embodiment of the present invention. As shown, the filtration/separation device 10 comprises a containment vessel 12 having an upper portion 14 and a lower portion 16. The containment vessel 12 may have almost any shape and may be comprised of almost any material. Disposed between the upper portion 14 and lower portion 16 is an electromagnetic matrix 18 which can be energized and de-energized in response to a master control signal 19. The energizing and de-energizing of the electromagnetic matrix 18 will be described more fully later herein.

In communication with the upper portion 14 of the containment vessel 12 is an inlet port 20, and the inlet port 20 receives a contaminated medium 22. As shown, the contaminated medium 22 flowing into the containment vessel 12 through the inlet port 20 can have both magnetic particles 24 and non-magnetic particles 26 suspended therein. The contaminated medium 22 may be almost any substance, such as fluid or air having particles suspended therein. For example, the contaminated medium 22 may be a water and steel dust mixture. The lower portion 16 of the containment vessel 12 comprises a collection area 28. Preferably, the bottom 30 of the lower portion 16 of the containment vessel 12 has sloped sides 32 in order to facilitate the efficient accumulation of non-magnetic particles 26 in the collection area 28. This accumulation of non-magnetic particles 26 in the collection area 28 will be more fully discussed later herein. As shown in FIG. 1, adjacent the collection area 28 is a valve 34, such as a blow valve, which leads to an outlet port 36. Preferably, the valve 34 is controlled by the same master control signal 19 as the electromagnetic matrix 18. In communication with the lower portion 16 of the containment vessel 12 is an outbound carrier 37, such as a vertically ascending conduit, that carries purified medium 38 away from the containment vessel 12 while the magnetic particles 24 are retained by the electromagnetic matrix 18 and the non-magnetic particles 26 settle in the collection area 28, as shown in FIG. 1. Preferably, the valve 34 is located directly adjacent the collection area 28 to assist in the efficient evacuation of the settle non-magnetic particles 26 therefrom as will be described more fully later herein.

Figure 3:
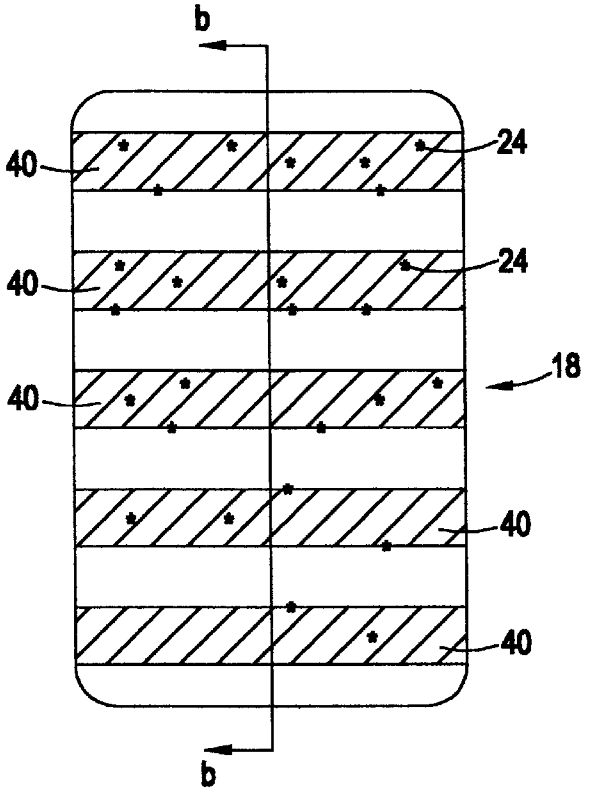
FIG. 3 is a cross-sectional view, taken along line a—a of FIG. 1, of the novel filtration/separation device of FIG. 1, showing the electromagnetic matrix and the attraction of magnetic particles thereto.
Figure 4:
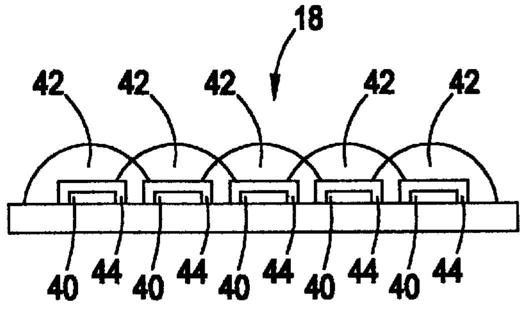
FIG. 4 is a cross-sectional view, taken along line b—b of FIG. 3, of the electromagnetic matrix of FIG. 3, showing overlapping electromagnetic fields produced thereby when the electromagnetic matrix is energized.

The electromagnetic matrix 18 disposed within the containment vessel 12 will now be described in more detail. As shown in FIGS. 1, 2, 3 and 4, the electromagnetic matrix 18 comprises a plurality of electromagnets 40, or different segments of electro-magnetizable material. Preferably, the magnets 40 are staggered in such a manner that the magnets 40 exert overlapping magnetic fields 42 when energized, as shown in FIG. 4. The overlapping magnetic fields 42 facilitate an extremely effective attraction of the magnetic particles 24 from the contaminated medium 22, as shown in FIGS. 1, 3 and 4. As shown in FIG. 4, the exterior surface 46 of each of the magnets 40 may be coated with a wear material 44 which does not substantially hinder the ability of the magnets 40 to attract, but which prolongs the effective life of the magnets 40. The magnets 40 of the electromagnetic matrix 18 retain the magnetic particles 24 of the contaminated medium 22 while the remainder of the contaminated medium 22 flows therepast. As the electromagnetic matrix 18 retains the magnetic particles 24, the non-magnetic particles 26 of the contaminated medium 22 settle and collect in the collection area 28, and the remainder of the contaminated medium 22, or a purified medium 38, flows into the outbound carrier 37, as shown in FIG. 1. The purified medium 38 is forced up into the outbound carrier 37 by forces exerted thereto as a result of contaminated medium 22 still flowing into the containment vessel 12 through the inlet port 20. The outbound carrier 37 is disposed a certain distance from the collection area 28 so as to allow purified medium 38 to flow into the outbound carrier 37 without also having some of the non-magnetic particles 26 which have settled in the collection area 28 also flow into the outbound carrier 37. To assist in forcing the purified medium 38 into the outbound carrier 37 from the containment vessel 12, it is possible to utilize some type of vacuum pressure within the outbound carrier 37.

Figure 2:
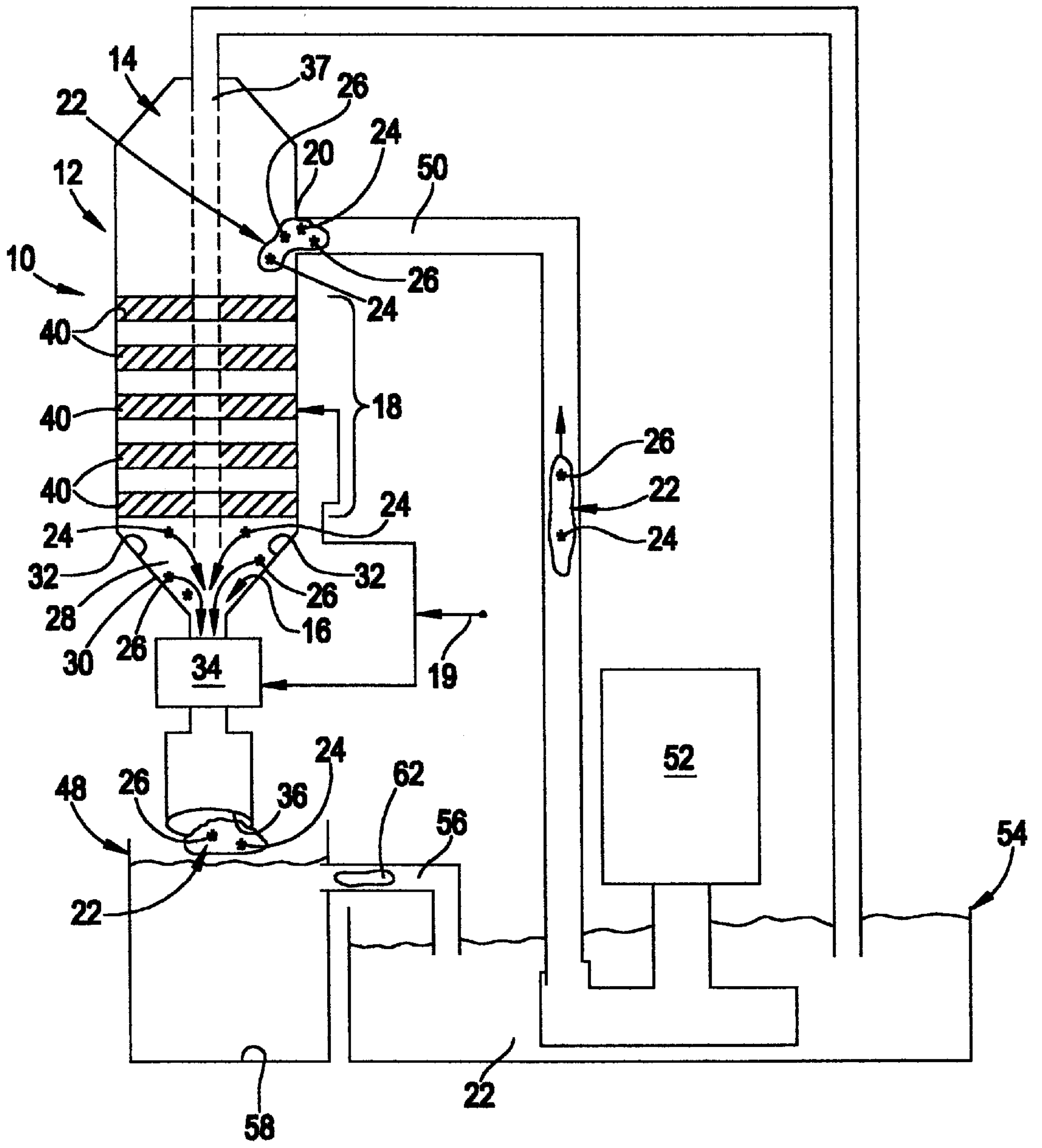
FIG. 2 is a schematic view of the novel filtration/separation device of FIG. 1 showing the operation thereof when the electromagnetic matrix is de-energized and the valve is opened.

As shown in FIG. 2, the containment vessel 12 may be situated such that adjacent to the outlet port 36 of the containment vessel 12 is a receiving container 48, such as a steel dust depository, for receiving contaminated medium 22, along with the magnetic particles 26 which had been retained by the electromagnetic matrix 18 and non-magnetic particles 24 which have settled in the collection area 28, all which exit the containment vessel 12 through the outlet port 36 as a result of the valve 34 being opened and the electromagnetic matrix 18 being de-energized in response to the master control signal 19. Preferably, the receiving container 48 is located directly below the outlet port 36 so that gravity and the incoming contaminated medium 22 may carry the magnetic particles 26, once retained by the electromagnetic matrix 18, and the non-magnetic particles 24, once settled in the collection area 28, from the containment vessel 12, through the outlet port 36, to the receiving container 48.

As mentioned, the inlet port 20 provides that the containment vessel 12 can receive contaminated medium 22. To this end, the inlet port 20 of the containment vessel 12 may be connected to an inbound carrier 50, such as a conduit, which carries the contaminated medium 22 to the containment vessel 12. The contaminated medium 22 may enter the containment vessel 12 under gravity. Alternatively, the contaminated medium 22 may enter the containment vessel under some exterior force. For example, as shown in FIGS. 1 and 2, the inbound carrier 50 may be connected to a pump 52 which forces the contaminated medium 22 from a recovery tank 54, along the inbound carrier 50, to the containment vessel 12.

As mentioned, and as shown in FIG. 1, in communication with the lower portion 16 of the containment vessel 12 is an outbound carrier 37 that carries purified medium 38 away from the containment vessel 12. As shown, the outbound carrier 37 may lead to the recovery tank 54 so that the purified medium 38 can be carried thereto from the containment vessel 12. Additionally, a drain pipe 56, such as a conduit or other passageway, may interconnect the receiving container 48 and the recovery tank 54. Preferably, the drain pipe 56 connects to the receiving container 48 enough of a distance from the bottom 58 of the receiving container 48 so that some of the magnetic particles 24 and non-magnetic particles 26 from the contaminated medium 22 can settle on the bottom 58 of the receiving container 48 and not travel into the drain pipe 56, thus allowing a somewhat purified medium 62 to carry from the receiving container 48 to the recovery tank 54.

Figure 5:
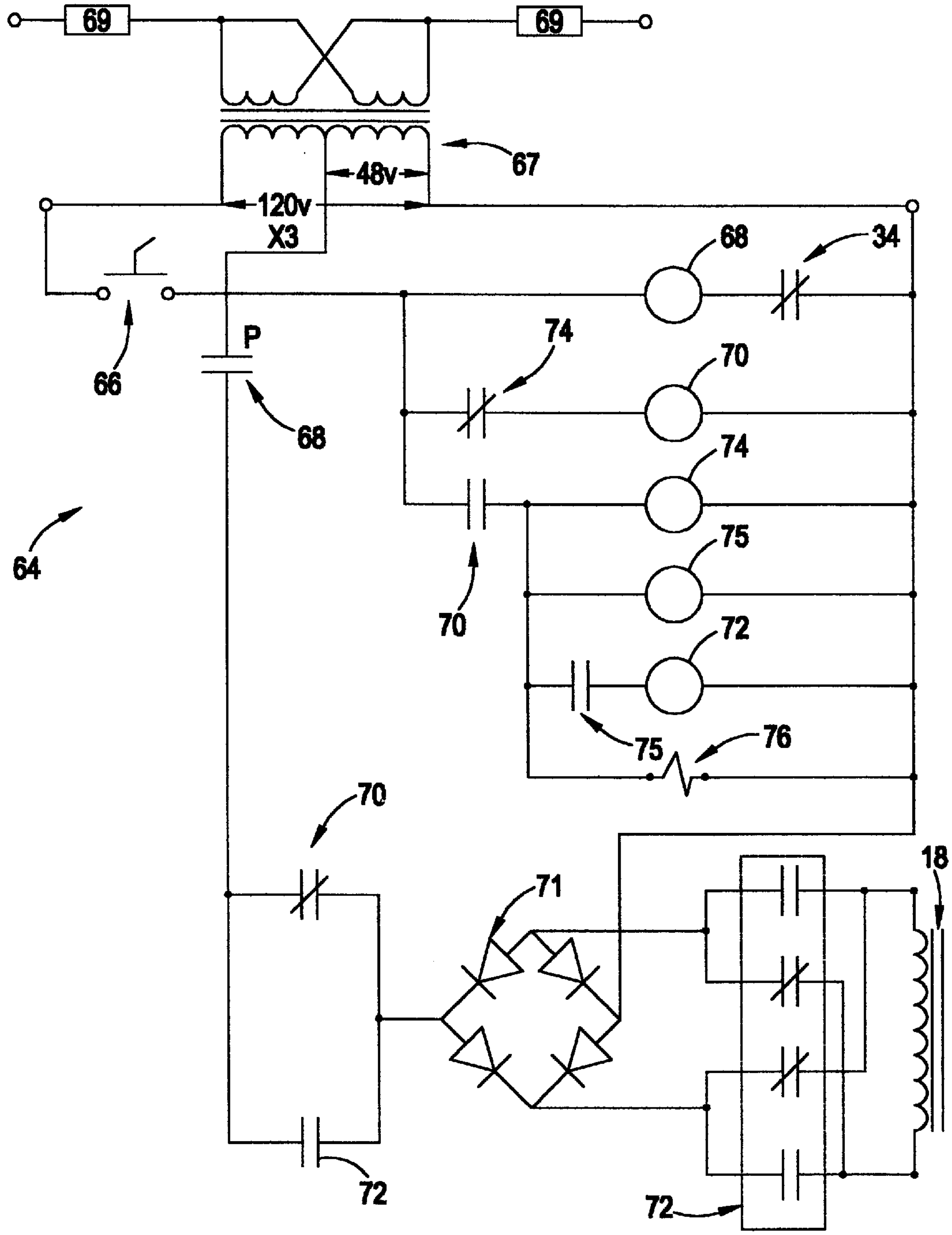
FIG. 5 is a simplified circuit diagram of an electric controller which can be used to energize and de-energize the electromagnetic matrix and operate the valve of the novel filtration/separation device of FIGS. 1 and 2.

Many types of devices, such as electrical, pneumatic, or mechanical devices can be used to control the operation of the pump 52 and produce the master control signal 19 used to operate the valve 34 and electromagnetic matrix 18 shown in FIGS. 1 and 2. For example, shown in FIG. 5 is an electrical controller 64 which may be used. The electrical controller 64 includes a power switch 66 which receives power from an external power source 67 such as a 3 phase 240 Volt or 480 Volt power source in communication with a 0.300 KVA transformer. The power source 67 may also be connected to one or more fuses 69. When the starter (not shown) of the pump 52 is energized, contact 68 is closed, and the pump 52 will start running thus sending contaminated medium 22 to the containment vessel 12 along the inbound carrier 50, as shown in FIGS. 1 and 2. When the electromagnetic matrix 18 is energized, it is energized through the normally closed contact 70, bridge rectifier 71, and the normally closed contact of relay 72. At this time, timer 74 begins timing through the contact 70. After a certain period of time, such as after two to three minutes, timer 74 and 75 turns on and opens the solenoid 76 and the valve 34. Timer 75 energizes relay 72 which de-energizes, or de-magnetizes the electromagnetic matrix 18 for a certain period of time. Timer 74 controls how long the valve 34 stays open, such as for three to five seconds. During such time, particles 24 and 26 along with incoming contaminated medium 22 exit the outlet port 36 of the containment vessel 12. After such time, the cycle repeats itself starting with timer 70.

Operation of the filtration/separation device 10 will now be described. Should the electrical controller 64 in FIG. 5 be utilized to operate the pump 52, the valve 34 and the electromagnetic matrix 18, the electrical controller 64 would cause the pump 52 to forward contaminated medium 22 from the recovery rank 54, along the inbound carrier 50, to the inlet port 20 of the containment vessel 12. At this time, the electrical controller 64 produces a master control signal 19 causing the electromagnetic matrix 18 to be energized and causing the valve 34 to be closed. Therefore, as the contaminated medium 22 flows into the containment vessel 12, and is introduced to the electromagnetic matrix 18, the magnets 40 of the electromagnetic matrix 18 attract and retain magnetic particles 24 from the contaminated medium 22. As the remainder of the contaminated medium 22 flows past the electromagnetic matrix 18, non-magnetic particles 26 settle within the collection area 28, and a resulting purified medium 38 flows into the outbound carrier 37. The purified medium 38 flows into the outbound carrier 37 because of forces being exerted on the purified medium 38 by the continuous introduction of the contaminated medium 22 to the containment vessel 12 through the inlet port 20. As shown in FIG. 1, preferably the outbound carrier 37 carries the purified medium 38 back to the recovery tank 54 and is recycled back to the containment vessel 12 by the pump 52.

After some time, the electrical controller 64 produces a master control signal 19 causing the electromagnetic matrix 18 to de-energize and causing the valve 34 to open. As a result, as shown in FIG. 2, the magnetic particles 24 are no longer attracted to the magnets 40 of the electromagnetic matrix 18, and the contaminated medium 22 carries the magnetic particles 24, which had been once retained by the electromagnetic matrix 18, through the valve 34 and out the output port 36, along with the non-magnetic particles 26 which had settled in the collection area 28. As the contaminated medium 22 and the particles 24 and 26 flow through the containment vessel 12 and to the outlet port 36, they work to scrub the electromagnetic matrix 18 and the inside of the containment vessel 12. Therefore, problems associated with accumulation on the magnets 40 are avoided, and the containment vessel 12 is kept clean. As the contaminated medium 22, the magnetic particles 24, which were once retained by the electromagnetic matrix 18, and the non-magnetic particles 26, which had settled in the collection area 28, flow through the outlet port 36, they flow thereafter down into the receiving container 48. Within the receiving container 48, some magnetic and non-magnetic particles, 24 and 26, respectively, will preferably settle on the bottom of the receiving container 48, and a somewhat purified medium 62 will travel through the drain pipe 56 to the recovery tank 54. After the contaminated medium 22, the magnetic particles 24, which were once retained by the electromagnetic matrix 18, and the non-magnetic particles 26, which had settled in the collection 28, flow through the outlet port 36, the process may be repeated in order to obtain and maintain as clear a medium as possible within the recovery tank 54.

Specifically, the filtration/separation device 10 in accordance with the present invention can be used within the field of steel grinding, and this specific application of the filtration/separation device 10 will now be described. As steel is grinded on a grinding table using one or more grinding stones (not shown), steel dust falls into the recovery tank 54 which is located under the grinding table. Because the steel dust, after some time, can damage the grinding stone(s), the steel dust is mixed with water within the recovery tank 54, and, as shown in FIG. 1, the pump 52 pumps the steel dust and water mixture (the contaminated medium 22) into the inbound carrier 50 and to the inlet port 20 of the containment vessel 12.

As the steel dust and water mixture travels from the recovery tank 54 and into the containment vessel 12 though the inlet port 20, the electromagnetic matrix 18 is energized and the valve 34, a blow down valve, is closed, preferably both in response to the master control signal 19. After the steel dust and water mixture enters the containment vessel 12, the steel dust and water mixture flows past the energized electromagnetic matrix 18. As the mixture flows past the electromagnetic matrix 18, the electromagnetic matrix 18 attracts the steel dust (magnetic particles 24) from the mixture, as shown in FIG. 1, and allows the remainder of the mixture to flow therepast.

After what remains of the mixture flows past the energized electromagnetic matrix 18, the mixture flows to the collection area 28 where other contaminant particles in the mixture, such as dirt, etc. (non-magnetic particles 26), settle. Additionally, if any steel dust (magnetic particles 24) have bypassed the electromagnetic matrix 18 and have therefore remained in the mixture, this steel dust would also settle in the collection area 28. Preferably, after the electromagnetic matrix 18 has attracted and retained the steel dust (magnetic particles 24) thereagainst, and after dirt and other particles (such as nonmagnetic particles 26) have settled in the collection area 28, the steel dust and water mixture has preferably been reduced to almost pure water (a purified medium 38). The water then flows into the outbound carrier 37 and travels to the recovery tank 54 where the water mixes with steel dust which has fallen thereinto from the grinding table. Thereafter, the steel dust and water mixture (contaminated medium 22) is again forwarded to the containment vessel 12 by the pump 52. After a period of time, for example, after a period of one to three minutes, the electromagnetic matrix 18 is deenergized and the valve 34, a blow down valve, is opened (preferably in response to the master control signal 19) while the steel dust and water mixture (contaminated medium 22) is still being supplied to the containment vessel 12 by the pump 52 as shown in FIG. 2. As a result of de-energizing the electromagnetic matrix 18, the electromagnetic matrix 18 releases the steel dust (magnetic particles 24) which had been retained by the electromagnetic matrix 18. Therefore, when the steel dust and water mixture enters the containment vessel 12 and flows past the de-energized electromagnetic matrix 18, the mixture carries away the steel dust (magnetic particles 24) which had been retained by the electromagnetic matrix 18. Additionally, the mixture scrubs away any dirt or other particles (such as non-magnetic particles 26) which had begun to accumulate on the electromagnetic matrix 18. As all this material flows from the electromagnetic matrix 18, the material travels to the collection area 28 where it further collects any dirt or other particles (such as non-magnetic particles 26) which had settled in the collection area 28. As the steel dust and water mixture flows through the containment vessel 12 and collects all this material, the mixture and collected material, including the steel dust (magnetic particles 24) released by the electromagnetic matrix 18, scrubs the inside of the containment vessel 12 and particularly the collection area 28 as the material flows thereby. From the collection area 28, all the material flows through the valve 34 and out the outlet port 36, as shown in FIG. 2. From the outlet port 36, all this material drops to the receiving container 48. In the receiving container 48, some particles (such as magnetic and non-magnetic particles, 24 and 26, respectively) settle at the bottom 58 of the receiving container 48 while a mixture of mostly water (a somewhat purified medium 62) flows from the receiving container 48 to the recovery tank 54 through the drain pipe 56. After some period of time, the electromagnetic matrix 18 is re-energized, the valve 34 is closed again, and the process is repeated. As the process is repeated over and over, the steel dust in the recovery tank 54 under the grinding table becomes removed therefrom, and mostly water remains therein. In other words, the steel dust and water mixture within the recovery tank 54 becomes clearer and clearer as the process is repeated over and over.

Figure 6:
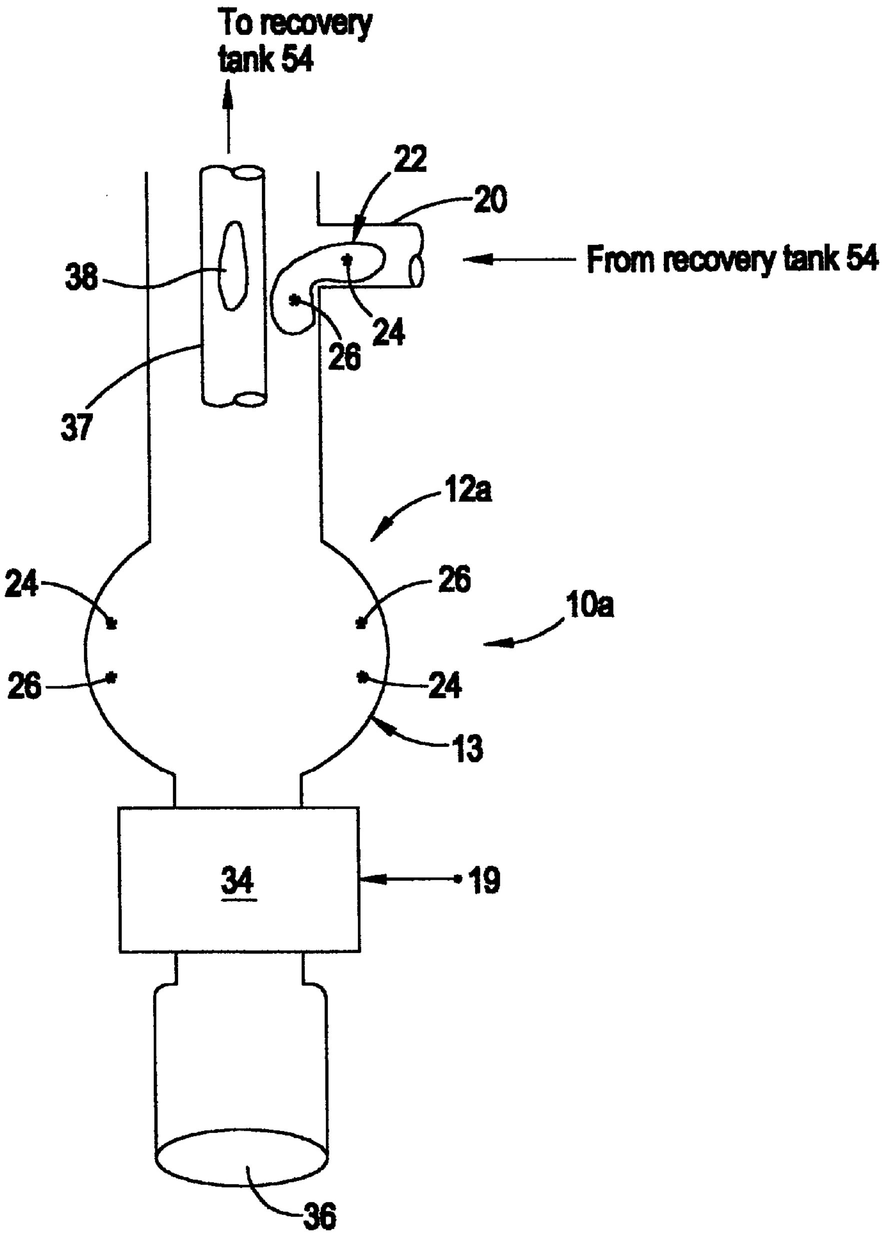
FIG. 6 is a schematic view of a filtration/separation device which is in accordance with an alternative embodiment of the present invention showing operation when unpurified medium flows into the device and a blow valve is kept closed, and showing purified medium leaving the device while particles are retained in an increased diameter, generally spherical portion of the containment vessel.
Figure 7:
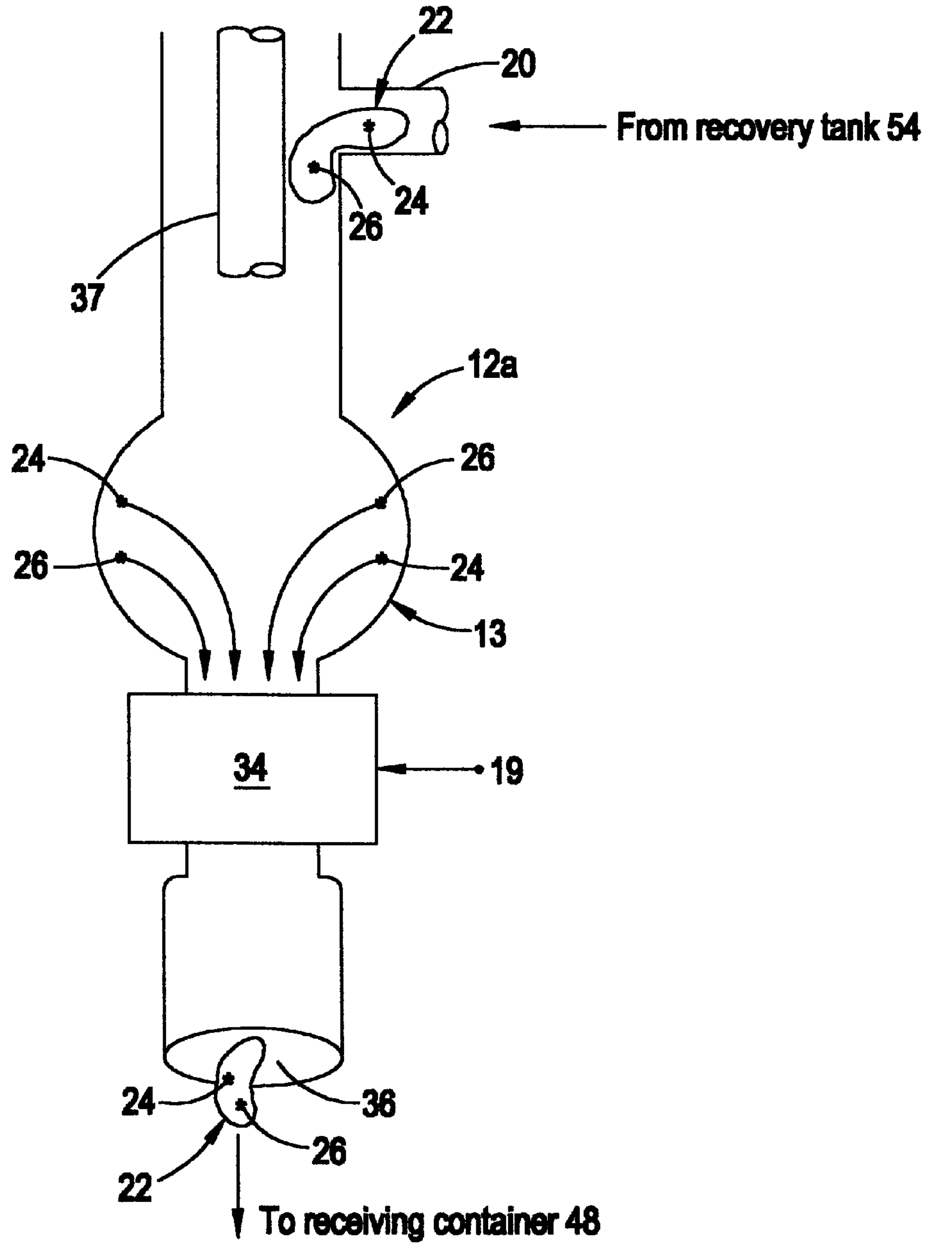
FIG. 7 is a schematic view of the filtration/separation device shown in FIG. 6, showing operation thereof when medium flows into the device and the blow valve is held opened, and showing the particles which had been retained in the increased diameter, generally spherical portion of the containment vessel being evacuated from the containment vessel, out the blow valve.

FIGS. 6 and 7 illustrate a filtration/separation device 10*a* which is in accordance with an alternative embodiment of the present invention. Because many parts of the device 10*a* are identical to the device 10 already described, identical reference numerals are used to identify identical parts, and a detailed description thereof is omitted. Additionally, because still other parts of the device 10*a* correspond to a similar, corresponding part of the device 10 as already described, identical reference numerals with the added alphabetic suffix "a" are used.

The device 10*a* includes a containment vessel 12*a* which includes an increased diameter, generally spherical lower portion 13. As shown, the increased diameter, generally spherical lower portion 13 is positioned generally above the valve 34. Much like the containment vessel 12 already described, the containment vessel 12*a* of device 10*a* is preferably associated with an inlet port 20 for carrying contaminated medium to the containment vessel 12*a*, an outbound carrier 37 for carrying purified medium from the containment vessel 12*a*, and an outlet port 36 below the blow valve for carrying particles from the containment vessel 12*a*. Similar to the device 10 previously described, the device 10*a* is preferably associated with a receiving container 48 and a recovery tank 54 (see FIGS. 1 and 2).

Operation of the device 10*a* will now be described. As shown in FIG. 6, preferably initially a contaminated medium 22 is fed to the containment vessel 12*a* through the inlet port 20. At this time, the valve 34 is held closed. As the contaminated medium 22 enters the containment vessel 12*a*, particles such as magnetic 24 and/or nonmagnetic particles which were suspended in the contaminated medium 22 become retained in the increased diameter, generally spherical lower portion 13 of the containment vessel 12*a*, while purified medium 38 travels into the outbound carrier 37.

After some time, preferably the valve 34 is opened, and the particles which were being retained in the increased diameter, generally sperical lower portion 13 of the containment vessel 12*a*, flush out of the containment vessel 12*a* and out the outlet port 36 as shown in FIG. 7. During the flushing, preferably contaminated medium 22 is still fed into the containment vessel 12*a* so that the contaminated medium 22 can help flush the particles which were being retained in the increased diameter, generally sperical lower portion 13 of the containment vessel 12*a*.

Figure 8:
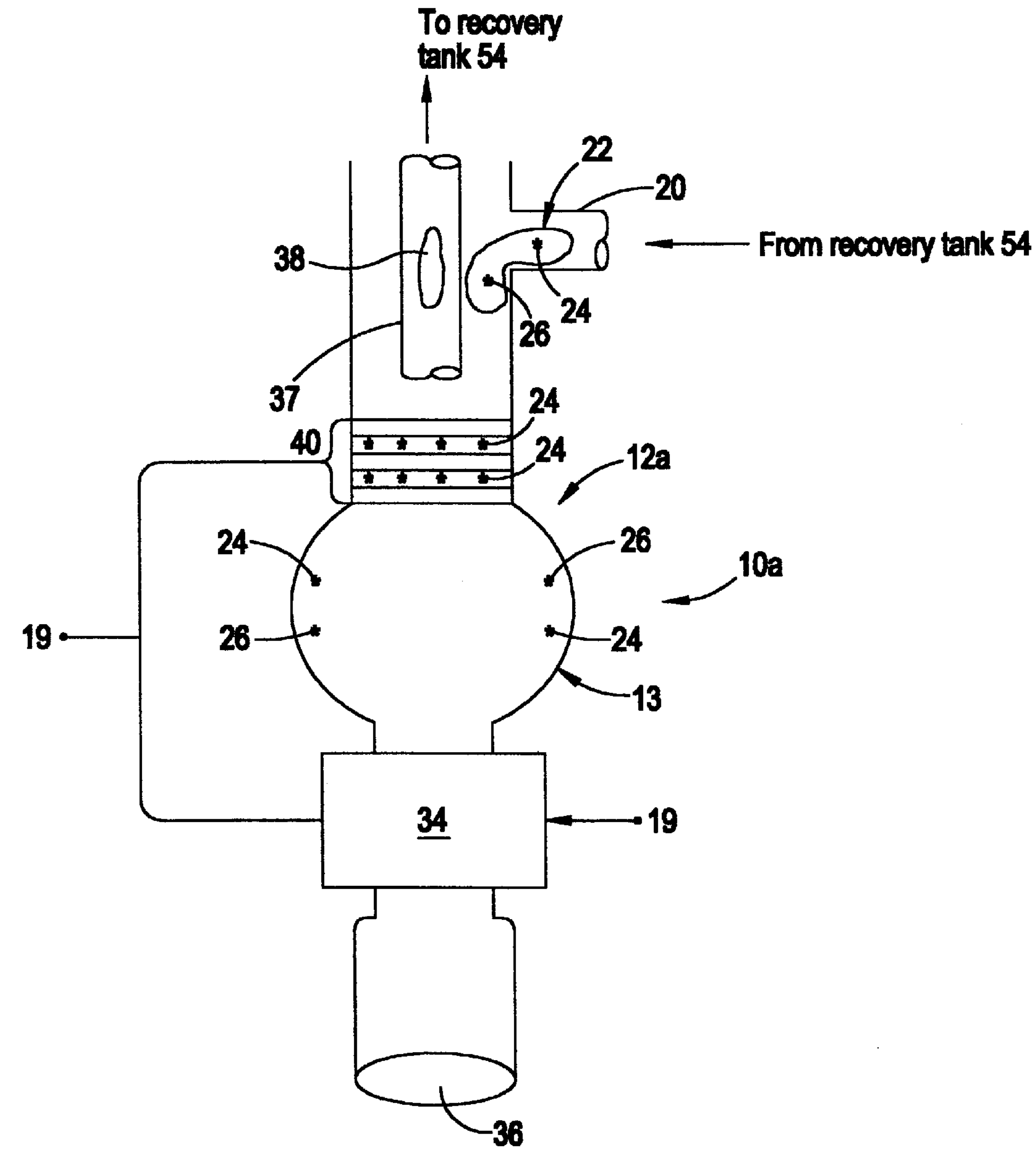
FIG. 8 is a schematic view of a filtration/separation device which is in accordance with still another alternative embodiment of the present invention showing operation when unpurified medium flows into the device and a blow valve is kept closed, and showing purified medium leaving the device while particles are retained in an increased diameter, generally spherical portion of the containment vessel and particles are attracted to an electromagnetic matrix of the device.
Figure 9:
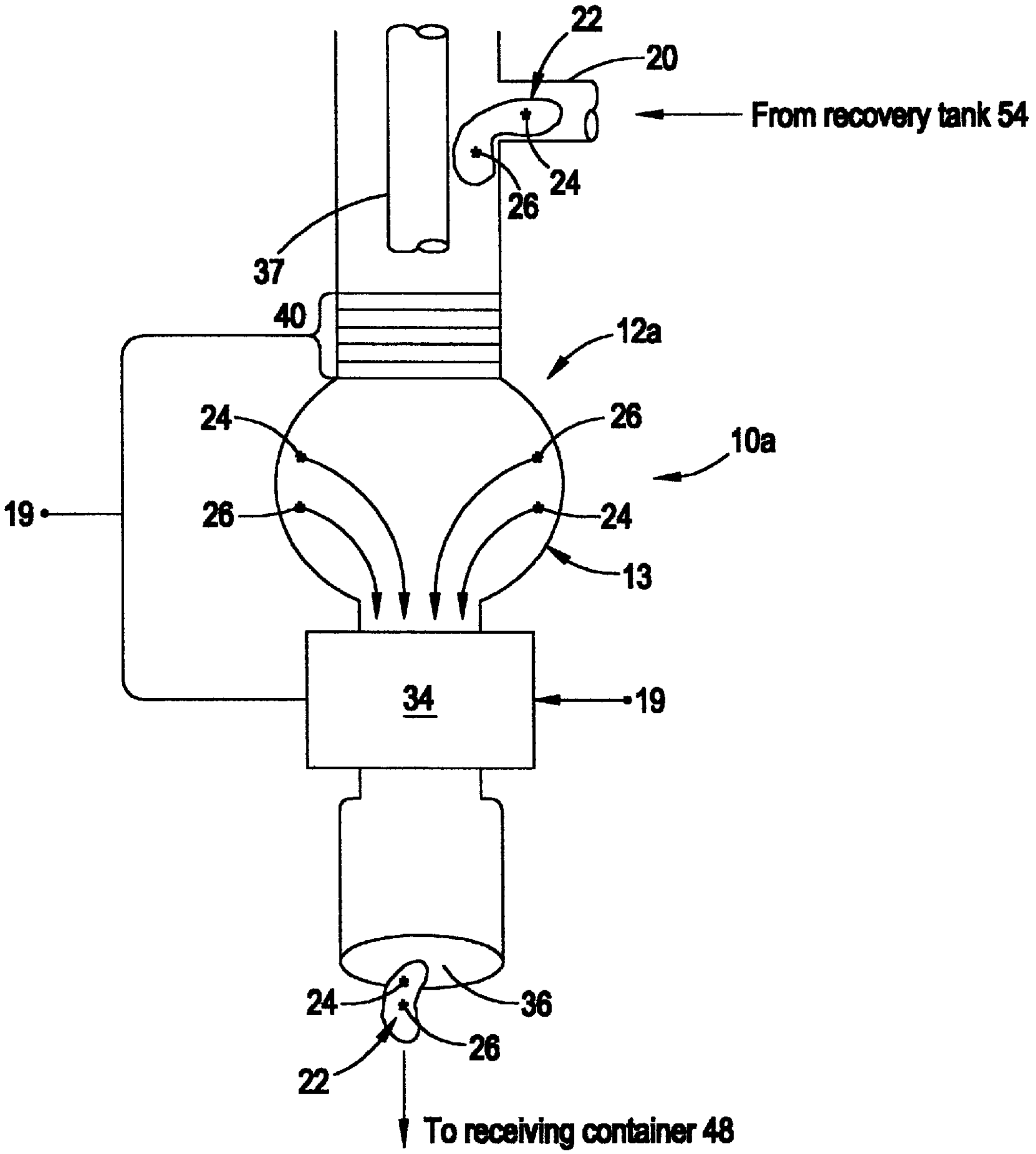
FIG. 9 is a schematic view of the filtration/separation device shown in FIG. 8, showing operation thereof when medium flows into the device and the blow valve is held opened, and showing the particles which had been retained in the increased diameter, generally spherical portion of the containment vessel and particles which had been attracted to the electromagnetic matrix being evacuated from the containment vessel, out the blow valve.

FIGS. 8 and 9 illustrate a filtration/separation device 10*b* which is in accordance with yet another embodiment of the present invention. Because many parts of the device 10*b* are identical to the devices 10 and 10*a* already described, identical reference numerals are used to identify identical parts, and a detailed description thereof is omitted. Additionally, because still other parts of the device 10*a* correspond to a similar, corresponding parts of the devices 10 and 10*a* as already described, identical reference numerals with the added alphabetic suffix "b" are used.

Like the device 10*a* shown in FIGS. 6 and 7, the device 10*b* shown in FIGS. 8 and 9 includes a containment vessel 12*b* which includes an increased diameter, generally spherical lower portion 13. In fact, preferably, the containment vessel 12*b* of device 10*b* is identical to that of device 10*a*, except the containment vessel 12*b* of device 10*b* includes an electromagnetic matrix 40 much like that of device 10. Much like the containment vessels 12 and 12*a* already described, the containment vessel 12*b* of device 10*b* is preferably associated with an inlet port 20 for carrying contaminated medium to the containment vessel 12*b*, an outbound carrier 37 for carrying purified medium from the containment vessel 12*b*, and an outlet port 36 below the blow valve 34 for carrying particles from the containment vessel 12*a*. Also, preferably the device 10*a* is associated with a receiving container 48 and a recovery tank 54 (see FIGS. 1 and 2) much like the devices 10 and 10*a* already described.

Operation of the device 10*b* will now be described. As shown in FIG. 8, preferably initially a contaminated medium 22 is fed to the containment vessel 12*a* through the inlet port 20. At this time, the valve 34 is held closed and the electromagnetic matrix 40 is energized. As the contaminated medium 22 enters the containment vessel 12*a*, particles such as magnetic 24 and/or nonmagnetic particles which were suspended in the contaminated medium 22 become retained in the increased diameter, generally sperical lower portion 13 of the containment vessel 12*a*, while purified medium 38 travels into the outbound carrier 37. Additionally, magnetic particles 24 become retained by the energized electromagnetic matrix 40.

After some time, preferably the valve 34 is opened, the electromagnetic matrix 40 is de-energized, and the particles which were being retained in the increased diameter, generally sperical lower portion 13 of the containment vessel 12*b* and on the electromagnetic matrix flush out of the containment vessel 12*b* and out the outlet port 36 as shown in FIG. 9. During the flushing, preferably contaminated medium 22 is still fed into the containment vessel 12*b* so that the contaminated medium 22 can help flush the particles which were being retained in the increased diameter, generally sperical lower portion 13 of the containment vessel 12*b* and the magnetic particles 24 which were being retained by the electromagnetic matrix 40.

Because the valve 34 is held closed while the electromagnetic matrix 40 is energized, and the electromagnetic matrix 40 is de-energized while the valve 34 is held open, the electromagnetic matrix 40 and the valve 34 can be actuated using the same master control signal 19.

Perhaps surprisingly, the device 10*a* shown in FIGS. 6 and 7 works practically as well as the device 10*b* shown in FIGS. 8 and 9 even though the device 10*a* does not include an electromagnetic matrix 40 like device 10*b*. This is because both devices 10*a* and 10*b* include an increased diameter, generally spherical portion 13 in the respective containment vessel 12*a*, 12*b*, and the increased diameter, generally spherical portion 13 is extremely efficient at retaining particles therein and allowing only purified medium to escape into the outbound carrier 37. In fact, it has been found that including the increased diameter, generally spherical portion in the containment vessel increases the rate of particle retention (i.e. cleansing of the contaminated medium) by as much as 500%.

While preferred embodiments of the present invention are shown and described, it is envisioned that those skilled in the art may devise various modifications of the present invention without departing from the spirit and scope of the appended claims.

The Invention claimed is:

1. A multi-particle filtration and separation device for removing magnetic and non-magnetic particles from a medium, said device comprising:

containment vessel;

an electromagnetic matrix in said containment vessel constructed to attract and retain magnetic particles thereupon;

an inlet port associated with said containment vessel for carrying the medium thereto, said containment vessel including an increased diameter portion configured to retain magnetic and non-magnetic particles from said medium therein;

an outbound carrier associated with said containment vessel for carrying a purified medium from said containment vessel;

an outlet port associated with said containment vessel for carrying the magnetic and non-magnetic particles away from said increased diameter portion and for carrying magnetic particles away from said electromagnetic matrix, said increased diameter portion being disposed between said electromagnetic matrix and said outlet port; and a valve between said containment vessel and said outlet port, said valve capable of being opened to allow said magnetic and non-magnetic particles being retained in said containment vessel to evacuate from said containment vessel through said outlet port.

2. The multi-particle filtration and separation device as recited in claim 1, wherein said increased diameter portion of said containment vessel is generally spherical.

3. The multi-particle filtration and separation device as recited in claim 1, said electromagnetic matrix being capable of being energized and de-energized in response to a master control signal, said valve being operated by said master control signal simultaneously with the energizing and de-energizing of said electromagnetic matrix.

4. The multi-particle filtration and separation device as recited in claim 3, wherein said electromagnetic matrix and said valve are configured with respect to said master control signal such that said master control signal simultaneously opens said valve and de-energizes said electromagnetic matrix, and wherein said master control signal simultaneously closes said valve and energizes said electromagnetic matrix.

5. The multi-particle filtration and separation device as recited in claim 1, said containment vessel constructed to accumulate magnetic and non-magnetic particles within the increased diameter portion while said purified medium flows into said outbound carrier.

6. The multi-particle filtration and separation device as recited in claim 1, said outbound carrier comprising a vertically ascending conduit in communication with said containment vessel, said conduit allowing said purified medium to flow upwardly within said conduit as a result of forces exerted by an introduction of the medium to said containment vessel through said inlet port.

7. The multi-particle filtration and separation device as recited in claim 1, wherein said electromagnetic matrix comprises a series of electromagnets staggered to provide overlapping electromagnetic fields upon said electromagnetic matrix being energized.

8. A multi-particle filtration and separation device for removing magnetic and non-magnetic particles from a medium, said device comprising:

a containment vessel;

an electromagnetic matrix in said containment vessel constructed to attract and retain magnetic particles thereupon;

an inlet port associated with said containment vessel for carrying the medium thereto, said containment vessel including an increased diameter, generally spherical portion configured to retain magnetic and non-magnetic, particles from said medium therein;

an outbound carrier associated with said containment vessel for carrying a purified medium from said containment vessel;

an outlet port associated with said containment vessel for carrying the magnetic and non-magnetic particles away from said increased diameter portion and for carrying magnetic particles away from said electromagnetic matrix, said increased diameter portion being between said electromagnet matrix and said outlet port; and a valve between said increased diameter, generally spherical portion of said containment vessel and said outlet port, said valve capable of being opened to allow said magnetic and non-magnetic particles being retained in said containment vessel to evacuate from said containment vessel through said outlet port.

9. The multi-particle filtration and separation device as recited in claim 8, said electromagnetic matrix capable of being energized and de-energized in response to a master control signal, said valve being operated by said master control signal simultaneously with the energizing and de-energizing of said electromagnetic matrix.

10. The multi-particle filtration and separation device as recited in claim 9, wherein said electromagnetic matrix and said valve are configured with respect to said master control signal such that said master control signal simultaneously opens said valve and de-energizes said electromagnetic matrix, and wherein said master control signal simultaneously closes said valve and energizes said electromagnetic matrix.

11. The multi-particle filtration and separation device as recited in claim 8, said containment vessel constructed to accumulate magnetic and non-magnetic particles within the increased diameter portion while said purified medium flows into said outbound carrier.

12. The multi-particle filtration and separation device as recited in claim 8, said outbound carrier comprising a vertically ascending conduit in communication with said containment vessel, said conduit allowing said purified medium to flow upwardly within said conduit as a result of forces exerted by an introduction of the medium to said containment vessel through said inlet port.

13. A method for removing magnetic and non-magnetic particles from a medium, said method comprising the steps of:

(a) providing a multi-particle filtration and separation which includes:

a containment vessel;

an electromagnetic matrix in said containment vessel constructed to attract and retain magnetic particles thereupon;

an inlet port associated with said containment vessel for carrying the medium thereto, said containment vessel including an increased diameter portion configured to retain magnetic and non-magnetic particles from said medium therein;

an outbound carrier associated with said containment vessel for carrying a purified medium from said containment vessel;

an outlet port associated with said containment vessel for carrying the magnetic and non-magnetic particles away from said increased diameter portion and for carrying magnetic particles away from said electromagnetic matrix said increased diameter portion being disposed between said electromagnetic matrix and said outlet port; and a valve between said containment vessel and said outlet port, said valve capable of being opened to alloy said magnetic and non-magnetic particles being retained in said containment vessel to evaluate from said containment vessel through said outlet port;

(b) introducing a flow of the medium to the containment vessel;

(c) energizing the electromagnetic matrix within said containment vessel while maintaining the valve in a closed position, said electromagnetic matrix attracting and retaining magnetic particles from the medium thereagainst;

(d) settling out magnetic and non-magnetic particles contained in the medium in said increased diameter portion of said containment vessel to obtain a purified medium;

(c) forwarding said purified medium from said containment vessel through said outbound carrier; and (f) opening said valve while de-energizing said electromagnetic matrix to evacuate said magnetic particles and said non-magnetic particles from said containment vessel.

* * * * *